Figure 1:
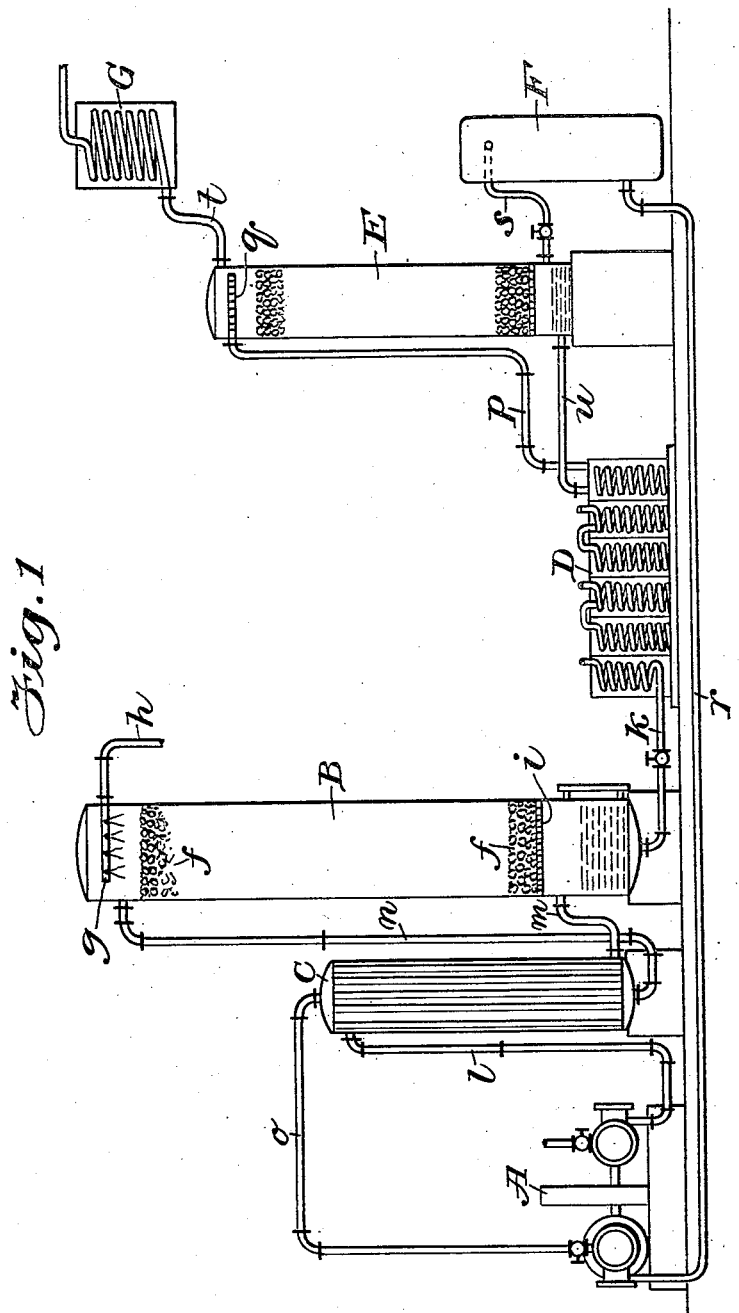

March 18, 1930. M. SCHROEDER 1,751,103
PROCESS FOR RECOVERING GAS CONSTITUENTS FROM GAS MIXTURES
Filed Oct. 29, 1924   2 Sheets-Sheet 1

INVENTOR
Max Schroeder
BY
HIS ATTORNEY

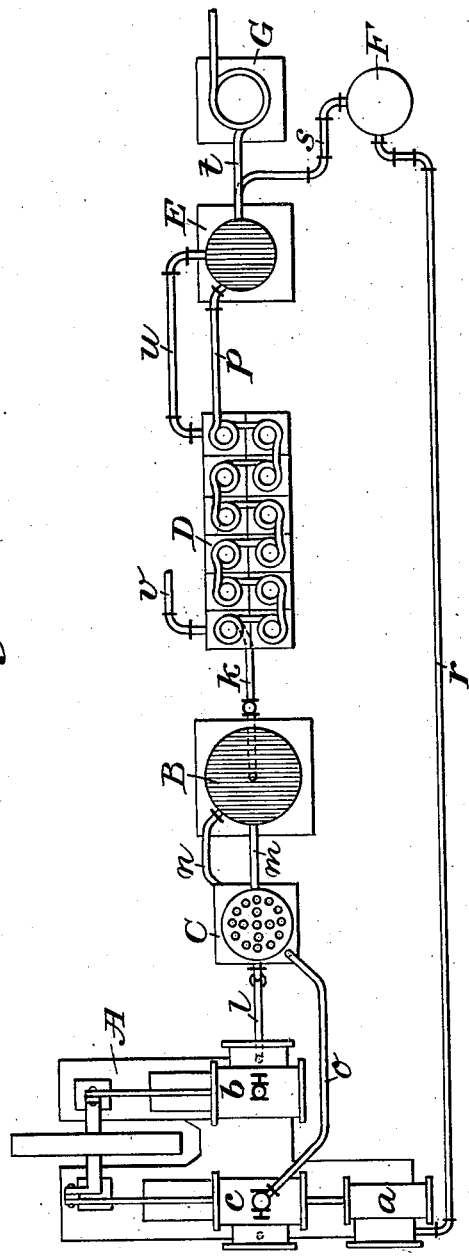

Patented Mar. 18, 1930

1,751,103

UNITED STATES PATENT OFFICE.

MAX SCHROEDER, OF BERLIN, GERMANY

PROCESS FOR RECOVERING GAS CONSTITUENTS FROM GAS MIXTURES

Application filed October 29, 1924, Serial No. 746,569, and in Germany August 12, 1924.

The recovering of valuable constituents from gases or gas-mixtures of a lower value, as for instance the recovering of benzol from coke-oven-gas, of ethylene from lighting-gas of dioxide of sulphur from roaster-gas, of carbonic acid from lime-kiln-gases or from combustion gases etc. is carried out by absorption or condensation in such a manner that the gases are brought into contact with with liquids which absorb these constituents or the condensation of these constituents is effected by means of porous bodies or by surfaces of condensation. The constituents separated in this way are then recovered in an approximately pure or at least useful form by heating the respective means of separation.

It is known that the separation of such constituents by means of absorption, adsorption or condensation may be obtained the better, the higher the pressure is under which the operation is carried out. In the treatment of gases with liquids, generally, the gas-absorption-rule is valid, according to which the quantity of the absorbed gas at equal temperature is approximately proportional to the partial-pressure of the gas in question within the gas-mixture. As this partial-pressure increases in the same measure as the absolute pressure, the absorbing-capacity of a liquid for a gas also rises within certain limits in an equal proportion with the absolute pressure.

Since the more valuable constituents exist, as a rule, only in small quantities in the gas-mixtures, the process for their recovery under pressure in most cases is too expensive, because a great deal of power is necessary for the compression of the great quantities of gas.

It is, however, to be observed that with the separation of a gas-constituent under pressure only that part of the useful effect of the power is used up which corresponds to the percentage of this constituent within the gas-mixture. If, for instance, the ethylene is wholly separated from a gas-mixture containing 2% of ethylene, only 2% of the effective power for compression is used up, whilst the remaining 98% remains in the unabsorbed gases leaving the absorber under a pressure equal to that under which they entered.

This power, which is not consumed is utilized by the new process in such a manner that by continuous working it is recovered as completely as possible during the compression of the succeeding fresh gases so that direct steam-power is saved.

A compressor adapted for this manner of working, therefore, has to be constructed in such a manner that it consists of one compression-cylinder and of two power-cylinders with expansion, one of which is driven by the pressure-gas coming from the absorber, whilst the second one is a steam-cylinder, by which that part of the power has to be replaced which is lost by the reduction in volume of the compressed gases as well as by the loss of the efficiency within the engine. Coupled turbo-blowers may also be employed instead of cylinder-compressors as far as they are adapted for the necessary compression.

Supposing a separation of 2% in the absorber and proportioning the gas-cylinders so that the compression-cylinder would have a volume of 100 and the pressure-gas-cylinder a volume of 98, the latter would use as much gas, as unabsorbed gas would be carried from the compression-cylinder to the absorber, provided that the pressure-gas-cylinder would run with a full filling and that the gases would have an equal temperature. The consequence would be, that pressure would not be produced in the absorber. The pressure-gas-cylinder, therefore, must be operated with a limited degree of filling, which has to be calculated according to the amount of pressure to be obtained and maintained in the absorber. If, for instance a continuous pressure of say 45 lbs. per square inch has to be obtained, the degree of filling, according to the rule of Mariotte, would be 25%, assuming equal temperatures. On starting the machine, the expansion-cylinder would use only 25% of the unabsorbed gas, coming from the compression-cylinder, whereas the remaining 75% would be throttled by the slide. Thereby, the pressure in the absorber will be increased at first quicker and later-on more slowly, because the expansion-cylinder takes away growing quantities of gas in the same measure as the pressure increases, till at 45 lbs. per square inch the state of equilibrium is obtained which will be continuously maintained during the same position of the slide. If a higher tension is wanted, the degree of filling of the expansion-cylinder has to be diminished by alteration of the motion of the slide.

During the compression a great deal of the energy is, however, changed into heat. This compression-heat, from which, at a pressure of 45 lbs. per square inch, a raising of temperature up to more than 100° C. results, will be lost if the hot gases are cooled in the usual manner for obtaining a favorable temperature of absorption. On the other hand, the gases coming from the absorber already in a cold state, are subjected to a further strong cooling by their expansion within the engine. From this further cooling a loss of energy results, because, owing to this cooling, the gas-volume exercising the pressure decreases.

For the purpose of saving steam-power it is therefore of considerable advantage to heat as highly as possible the pressure-gas coming from the absorber, prior to its entering the expansion-cylinder. This may be done, in the first line, by transferring the compression-heat of the gas, before it enters the absorber, to the gas coming from the absorber within a heat-exchanger. There are, however, other quantities of energy, which may be utilized in this manner and which would be lost otherwise or would have no value. Such quantities of energy are furnished, for instance, by the combustion gases of steam-boilers, smelting-furnaces etc. Frequently the gases under treatment themselves possess high temperatures which may be utilized by transferring them to the gas to be expanded as for instance coke-oven-gas, roaster-gas and others.

Though the pressure on its way from the absorber to the expansion-cylinder cannot be increased, the additional quantities of energy obtained by the heating of the gases, nevertheless effect a considerable increasing of the volume. With an increase of temperature of 273° C. which can without difficulty be obtained in a system of tubes, contacted by hot gases, the volume of the compressed gases would nearly be doubled. From this fact it follows that the hot-running expansion-cylinder may work with double the degree of filling or may have a proportionately larger diameter than that working with cold gases. Thereby the power of the expanding gases may be raised in such a manner that it alone is sufficient for the compression of the succeeding gases, so that under favorable circumstances the compression may be effected nearly without any costs or, at any rate with only a small amount of steam.

As already mentioned above the partial pressure of a gas increases in the same proportion as the absolute pressure of a gas-mixture, in which it is contained. The absorbing capacity of a liquid for a gas can be increased, therefor, by carrying out the absorption under a pressure higher than that of the atmosphere. If, for example, the absorption of $SO_2$ from a 6–7% gas-mixture is being done under a pressure of about 15 lbs. per square inch, a 2% aqueous solution is formed; consequently, in working under this pressure, for absorbing the same quantity $SO_2$ only one half of the water is required, as when working without pressure. At a pressure of about 30 lbs. per sq. inch, a 3% solution and at a pressure of about 45 lbs. per sq. inch, a 4% solution is formed, and the quantities of water required for the absorption are consequently reduced to $\frac{1}{3}$ and $\frac{1}{4}$ of the quantity required when working under atmospheric pressure. The advantage gained by reducing the quantity of water and consequently the quantity of steam required for heating the water to the boiling point is, however, only up to a certain limit of pressure considerably greater than the power necessary for generating the pressure in the gas-mixture. The steam used in an engine with expansion can be utilized for heating the aqueous solution to the boiling point as well as fresh steam now being used for the purpose. Hence, for the compression only that part of the energy in the steam that has done actual work must be calculated.

The quantity of steam used for compression grows in the same measure in which the compression increases while the consumption of steam for bringing the gas-solutions to the boiling point decreases in the same measure in which the pressure increases, under which the gas has been absorbed, since the quantity of water required decreases with the increasing pressure. Consequently the process works in the most economical manner, if it is so balanced, that the quantity of exhaust-steam from the steam-driven compressor is approximately the same as the quantity of steam required for bringing the gas-solution to the boiling point.

Finally, a considerable advantage for the absorption under pressure lies in the fact, that the solution in the lower part of the absorbing tower is also under pressure and therefore able to rise through the preheater to the top of a tower, in which the gas contained in the solution, is liberated by steam. As this tower is worked according to the counter-current system, only very little steam is used. Heretofore, the use of a tower for this purpose offered great difficulties on account of the fact, that very often acid-solutions are to be lifted. There are no pumps, which will stand the action of a hot acid-solution for any length of time. In the process described no acid-solution has to be lifted by pumps.

To illustrate the economical advantage of the new process, the following example may serve:

The manufacture of 10,000 kilograms of pure $SO_2$-gas in 24 hours will require approximately 60,000 cbm. of a 6% roaster-gas. For absorbing the $SO_2$ from this gas-volume under a pressure of about 30 lbs. per sq. inch above the atmospheric pressure, theoretically about 130 H. P. are required for compression. As modern compressors have an efficiency of more than 90%, the practical power required for compression will therefore be about 150 H. P. Assuming that only 50% of the energy in the compressed gas can be utilized in the gas-pressure cylinder of the compressor, about 75 H. P. of steam-power would be required for compression.

Further, assuming a steam-consumption of 400 kilograms per H. P. per day, the quantity of steam required would be 30,000 kilograms for the generation of which about 4,500 kilograms of coal are required. As under a pressure of 30 lbs. per sq. inch above atmospheric pressure aqueous solutions with 3% $SO_2$, which solutions contain 30 kilograms $SO_2$ in 1 cbm. of water, can be made from a 6% gas, there are for a daily production of 10,000 kilograms $SO_2$ about 333 cbm. of water needed. To preheat this quantity by the boiling hot waste water leaving the tower, in which the $SO_2$ is liberated to 70° C., offers no difficulties.

To heat the solution from 70° C. to 100° C. requires about 10 million calories. As in each kilogram of exhaust-steam from the compressor there are about 500 cal., the 30,000 kilograms of steam, required daily for compression, contain 15 million calories, which are more than sufficient for liberating the $SO_2$ from its preheated solution. Consequently, by the new process 10,000 kilograms of pure $SO_2$ gas can be made with only 4,500 kilograms of coal, while more than 4 times this quantity, viz about 20,000 kilograms of coal are required by the present process.

The drawing shows by way of example a plant for carrying out the new process.

Fig. 1 is a side-view of the plant and Fig. 2 a view from above.

A is a compressor with three cylinders, viz the steam-cylinder $a$, the cylinder of compression $b$, and the pressure-gas-cylinder $c$, in which the energy of the unabsorbed pressure-gas is being utilized. B is an absorbing-tower, filled up with filling materal $f$, resting on a grate $i$, and over which a coil $g$ distributes the water of absorption from pipe $h$. In the lower part of the tower B the solution accumulates and is carried from there through tube $k$ to its further use.

The gas coming from the compressor A and being under high pressure flows through pipe $l$ into the heat-exchanger C, consisting of a tube-boiler. Here the gas passes through the open space of the boiler, lying outside the tubes and, then, enters the absorber B by tube $m$, where it, on its way to the top of the tower, transfers the constituent to be obtained, e. g. $SO_2$ from roaster-gas, to the liquid drizzling down. The gas leaves the absorber from above and returns by tube $n$ to the heat-exchanger C, where it is heated by means of the hot compression-gases on its way through the interior tubes to the top of the exchanger. In order to obtain higher temperatures other gas-heaters may be arranged, in which the heat from other sources is utilized. These heat exchangers may be tube-boilers, as shown in the drawing or simple tube-systems, arranged in a heating-channel. Finally the heated compression-gas returns through tube $o$ to the driving-cylinder $c$ of the compressor A, where its power is again utilized in a continuous operation.

Instead of absorption-towers, systems of columns or simple plunge-devices may be used. Furthermore, the three-cylinder-compressor may be replaced by other suitable compression-engines.

As, in many cases, the steam-cylinder $a$ is actuated, for the production of the necessary compression, only in the beginning of the process, whereafter the plant may be operated exclusively by the aid of the surplus of heat, it will be useful to effect the start of the plant in such cases by a small electric motor, so that a steam-plant is wholly avoided.

The solution, e. g. the $SO_2$-solution, in the lower part of the absorbing tower flows continuously, regulated by a valve, in line $k$ through a system of lead-coils D, serving as heat-exchanger, in which it absorbs heat from the acid-free hot water, which flows from tower E outside of the lead-coils in a counter-current. The preheated $SO_2$-solution rises under its own pressure through pipe $p$ and distributing coil $q$ to the top of tower E, and in dripping over the filling material in this tower is liberated of its $SO_2$-content by the exhaust-steam from cylinder $a$ of the compressor, which steam passes through pipe $r$, the steam-accumulator F and pipe $s$ into the lower part of tower E. The $SO_2$-gas leaves the tower through pipe $t$ into the return-cooler G, in which it is freed from steam.

Through pipe $u$ the boiling hot and acid-free water returns from the tower E into the preheater D, in which it flows in open boxes around the lead coils to transfer its heat in a counter current to the cold $SO_2$-solution inside of the lead-coils. Finally it goes through pipe $v$ to waste.

The pure $SO_2$-gas can be used for the manufacture of anhydrous liquid sulfurous acid, also in mixture with air for the manufacture of sulfuric acid or oleum by a contact-process, where, by its purity, it offers the material advantage, that the contact-material, containing platinum, remains indefinitely uncontaminated and consequently highly active. Another advantage is that the apparatus can be much smaller than when working with roaster-gases.

The process of absorbing $SO_2$ under pressure in a tower can also be used for the manufacture of calcium-bisulfite-solutions for making wood-pulp. The solutions contain by far more $SO_2$ than when working without pressure in towers. This is a special advantage in hot weather and when gases low in $SO_2$ are being used.

Having now particularly described and ascertained the nature of my said invention and in what manner the same is to be performed, I declare that what I claim is:

1. The cyclic process for recovering sulfur dioxide from a gas mixture containing the same and a gaseous component which is relatively insoluble in water which comprises compressing the gas mixture by means of force supplied in part by steam and in part by said gaseous component after the same has been compressed, separated from the gas mixture and heated, subjecting the gas mixture while maintaining it compressed to an absorbing operation by contacting it with water, separating the unabsorbed gaseous component from the resulting aqueous solution of sulfur dioxide, heating and delivering it while maintaining it compressed to the gas mixture compressing operation, elevating said aqueous solution of sulfur dioxide by means of the gas pressure maintained on it during the absorbing operation and liberating its sulfur dioxide content by counter-current treatment with exhaust steam from said gas mixture compressing operation, and preheating said aqueous solution of sulfur dioxide on its way to the sulfur dioxide liberating operation by heat transfer thereto from the water leaving said sulfur dioxide liberating operation.

2. The cyclic process for recovering sulfur dioxide from a gas mixture containing the same and a gaseous component which is relatively insoluble in water as defined in claim 1 in which the unabsorbed gaseous component of the gas mixture after separation from the aqueous solution of sulfur dioxide is heated by transfer of heat thereto from the compressed gas mixture on its way to the sulfur dioxide absorbing operation.

3. In a cyclic process for recovering sulfur dioxide from a gas mixture containing the same and a gaseous component which is relatively insoluble in water involving the operations of compressing the gas mixture by means of force supplied in part by steam and in part by said gaseous component after the same has been compressed, separated from the gas mixture and heated, subjecting the compressed gas mixture to absorbing contact with water while maintaining it compressed and liberating sulfur dioxide from the resulting aqueous solution thereof by means of heat, the step which consists in supplying said heat to said aqueous solution by counter-current treatment of the solution with exhaust steam from the gas mixture compressing operation.

MAX SCHROEDER.